UNITED STATES PATENT OFFICE.

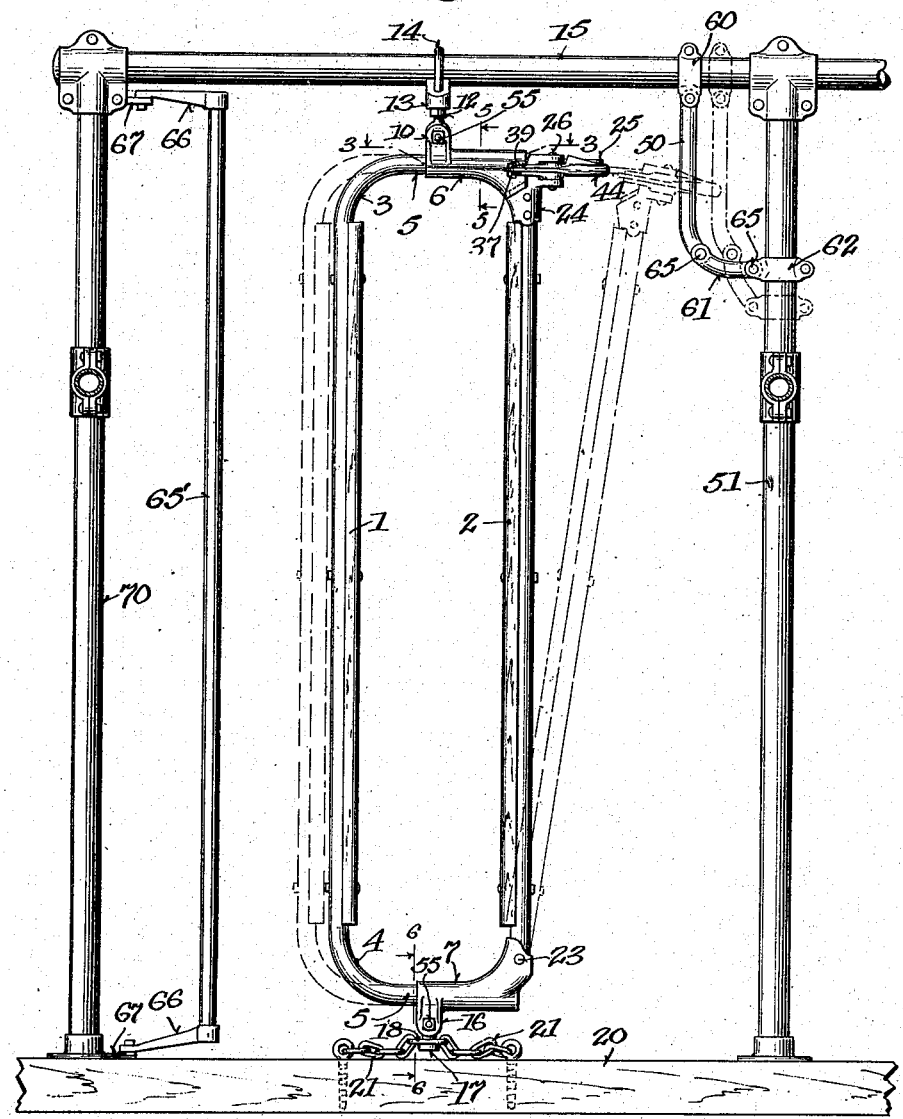

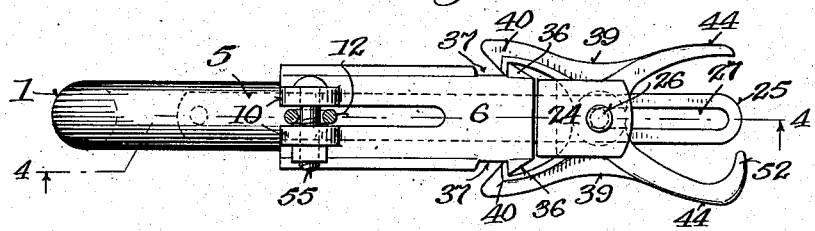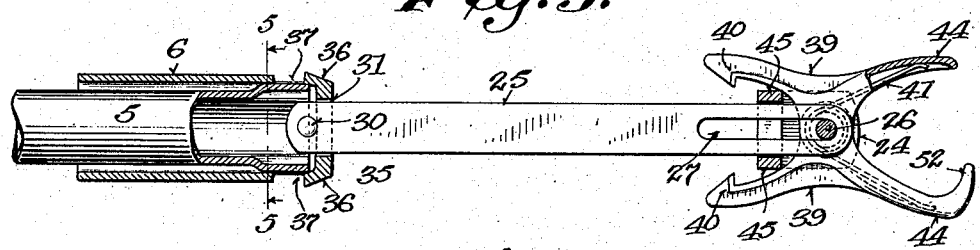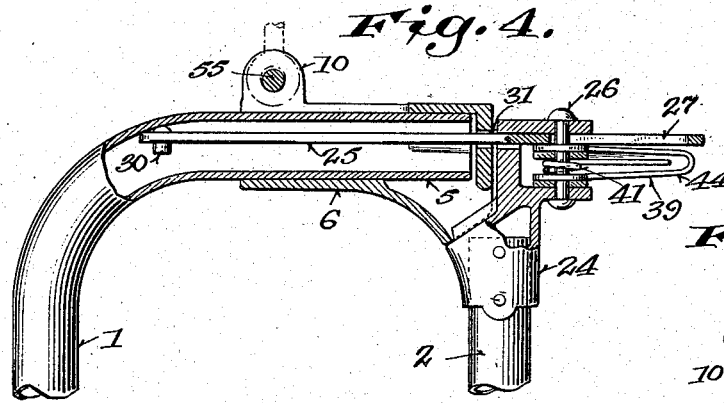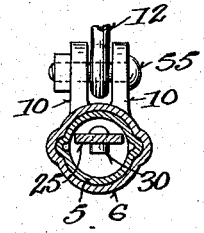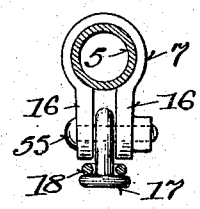

JOHN G. SHODRON AND JOHN B. OLSON, OF FORT ATKINSON, WISCONSIN, ASSIGNORS TO JAMES MANUFACTURING COMPANY, OF FORT ATKINSON, WISCONSIN, A CORPORATION OF WISCONSIN.

CATTLE-STANCHION.

1,364,413.     Specification of Letters Patent.     Patented Jan. 4, 1921.

Application filed August 30, 1916. Serial No. 117,588.

*To all whom it may concern:*

Be it known that we, JOHN G. SHODRON and JOHN B. OLSON, citizens of the United States, residing at the city of Fort Atkinson, county of Jefferson, and State of Wisconsin, have invented new and useful Improvements in Cattle-Stanchions, of which the following is a specification.

Our invention relates to improvements in cattle stanchions and pertains especially to improvements in that class of stanchions shown and described in a companion application dated July 31st, 1916, and filed by John B. Olson, August 30th, 1916, Serial No. 117,587.

The objects of the present invention are to provide a more simple and less expensive structure than that disclosed in the above mentioned application, whereby the stanchion bars may be adjusted to receive and securely hold cattle having either large or small necks. In the companion application above referred to an adjustment of the stanchion bars may be effected without destroying the balance of the stanchion, both bars remaining at an equal distance from the central axis of the stanchion. In the present structure we provide a simpler mechanism which secures the advantage of adjustment without the advantage of balance, when the bars are most widely separated.

A further object of our invention is to provide an adjustable corner brace for receiving the inclinable stanchion member and holding it laterally in open position without permitting the stanchion to swing or the inclinable member to be pushed inwardly to closed position in case the animal attempts to thrust its head through the space between the inclinable member and one of the posts of the stanchion frame. The object of making the corner brace adjustable is to increase or diminish the distance between its vertical portion and the post of the stanchion supporting frame with which it is connected, thereby enabling us to apply our corner brace to stanchion frames of varying widths and still allow the inclinable member to swing to its full open position, notwithstanding the fact of its engagement with the corner brace. A further object of our invention is to provide an improved slide bar for connecting the inclinable member with the other portions of the stanchion, whereby the inclinable member may be allowed a greater range of movement than the possible distance which the slide is permitted to move in telescoping relation to the fixed upper horizontal member of the stanchion.

In the drawings:—

Figure 1 represents a front view of one pair of stanchions connected with the stanchion supporting frame.

Fig. 2 is a plan view of the stanchions shown in Fig. 1 in a closed or connected position.

Fig. 3 is a plan view, part in section of the device shown in Fig. 2 the sectional part referred to being drawn on line 3, 3 of Fig. 1.

Fig. 4 is a detail in vertical section, drawn on line 4, 4 of Fig. 2.

Fig. 5 is a detail, drawn on line 5, 5 of Fig. 1, and

Fig. 6 is a detail, drawn on line 6, 6 of Fig. 1.

Like parts are referred to by the same reference numerals throughout the several views.

The stanchion comprises a set of stanchion bars 1 and 2, the bar 1 having curved elbows 3 and 4 at top and bottom respectively and horizontal extensions 5 which project into the tubular horizontal bars 6 and 7 respectively. The upper bar 6 is provided with upwardly projecting ears 10 bolted to a connecting member 12 swiveled at 13 to a coupling 14 secured to the upper frame rod 15. The lower horizontal member 7 is provided with depending ears 16 to which a swivel head 17 is bolted, said swivel head being engaged in a bearing member 18 connected with lower frame bar 20 by chains 21. The inclinable stanchion bar 2 is pivoted to an upwardly projecting portion of the bar 7 at 23 and at its upper end the bar 2 is provided with a head bracket 24 connected with a slide 25 by a pivot pin 26 extending vertically through a slot 27 in the slide. The opposite end of the slide 25 is telescoped within the hollow horizontal bar 6, and is also adapted to slide within the tubular portion 5 comprising the upper extremity of the bar 1. The slide 25 is prevented from wholly releasing from the bar 6 by a cross pin 30 spanning a slot 31 in the end of the hollow bar 6 through which slot the slide 25 passes.

It will be observed that the end cap 35 of the hollow bar 6 is tapered at 36, back of which, notches 37 are provided. A set of pivoted latch bars 39 are connected with the head bracket 24 by the vertical pivot post 26, and each of these latch bars is provided with a latch hook 40 at its inner end. A coiled spring 41 encircles the pivot post 26 and is under tension with its ends engaged in the latch bar handles 44, whereby these handles tend to spread and swing the latch hooks 40 inwardly. The inward movement is limited, however, by projections 45 on head bracket 24, whereby the latch hooks are held in a position to engage and travel over the inclined faces 36 and into engagement in the recesses 37 of the horizontal member 6, when the inclinable stanchion bar 2 is swung inwardly to closed position. The latch hooks can only be released from these notches 37 by pressing both of the handles 44 inwardly simultaneously. The latch handles also are adapted, when the inclinable member is swung outwardly, to engage the vertical portion 50 of a corner brace connected with the upper cross bar 15 of the stanchion frame and also with the vertical post 51 of such frame. The hook 52 on one of the handles 44 is adapted to prevent an animal from forcing the inclinable member inwardly to closed position by inserting its nose or head in the space between post 51 and an outwardly swung inclinable bar 2.

The horizontal stanchion bars or hollow members 6 and 7 are preferably split and the ears 10 and 17 serve as clamping ears, whereby the members 6 and 7 may be clamped to the horizontal portions 5 at the upper and lower ends of the stanchion bar 1. The clamping pressure may be secured by means of the connecting bolts 55. By loosening these bolts stanchion bar 1 may be moved bodily to or from the inclinable bar 2, thereby decreasing or increasing the width of the stanchion. When the bar 1 is adjusted in a position suitable to the requirements of the neck of the animal to be confined by the stanchion the clamping bolts 55 will be tightened, thereby securing the bar 1 in its adjusted position. Owing to the fact that the upper portion 5 of the bar 1 is tubular and receives the slide 25, it is necessary to make the slide relatively short on account of the elbow 3. Therefore to secure the proper extensions of the inclinable bar 2, we provide the slot 27 in slide 25, whereby when the inclinable bar is to be closed, slide 25 may move inwardly as far as possible, and bar 2 may move inwardly an additional distance equal to the length of the slot 27, pin 26 moving to the inner end of said slot.

When the inclinable bar is swung outwardly, pin 26 may move to the outer end of the slot in addition to the movement of the slide.

Referring now to the corner brace, it will be observed that the vertical portion 50 is clamped at 60 to the horizontal frame bar 15. The lower end of the portion 50 is connected by a curved link 61 with a clamping bracket 62 secured to the vertical frame post 51. The curved link 61 is pivoted at its respective ends to the clamping member 62 and the vertical portion 50 of the corner bracket, pivot bolts or pins 65 being illustrated. This arrangement permits the vertical portion 50 to be adjusted to or from the vertical post 51, one such adjustment being indicated by dotted lines in Fig. 1. This corner brace is therefore adapted to be used in connection with stanchion frames of differing widths. The length of the vertical portion 50 is not essential to our invention— it may be of any desired length. This corner brace is not only adapted to support the inclinable member when in open position, but it is also adapted to coöperate with the inclinable member in preventing the animal from putting its nose or head through between this member and the post 51. The animal will, ordinarily, not lower its head to any great extent in making this attempt, but as above stated the corner brace may be made of any length and it is therefore adapted to fill this space to any desired extent. It will be observed that on the opposite side of the stanchion we have provided a swinging stop rod 65′ having arms 66 at its upper and lower ends which are pivotally connected with brackets 67, whereby the bar 65 may be employed to guard the space between post 70 and stanchion bar 1. This rod 65′ therefore performs a somewhat similar function on one side of the stanchion frame to that performed by the corner bracket 50 and the inclinable stanchion bar on the other side. The rod 65′ and its connections have, however, been made the subject of the separate application referred to above and are not claimed herein.

We claim:—

1. A stanchion comprising the combination of relatively fixed and inclinable stanchion bars, and a slide movably connected with both bars, and adapted to extend and retract along the line of its own axis, relatively to the respective bars, and to span the space between their respective ends in all positions of adjustment.

2. A stanchion comprising the combination of relatively fixed and inclinable stanchion bars, and a slide movably connected with both bars, and adapted to extend and retract along the line of its own axis relatively to the respective bars, and to span the space between their respective ends in all positions of adjustment, the upper end of one of the bars being a tubular curved elbow, and said slide being adapted for telescoping movement within said elbow to a point of contact with its wall.

3. A stanchion comprising the combination of relatively fixed and inclinable stanchion bars, and a slide movably connected with both bars, and adapted to extend and retract along the line of its own axis, relatively to the respective bars, and to span the space between their respective ends in all positions of adjustment, one of the bars having a hollowed elbowed portion at its upper end provided with a slotted end cap, and said slide comprising a flat straight bar adapted to movably fit in said slot, and provided with an interior stop, the other end thereof being in sliding pivotal connection with the other bar, and adapted to move across its axis.

4. A stanchion comprising the combination of relatively fixed and inclinable stanchion bars, and a slide movably connected with both bars, and adapted to extend and retract along the line of its own axis, relatively to the respective bars, and to span the space between their respective ends in all positions of adjustment, one end of said slide being arranged to telescope in one of the stanchion bars, and the other end being slotted and loosely connected with the other bar by a pivot pin.

5. A stanchion having relatively fixed and inclinable stanchion bars, and a slide connecting their upper ends, and capable of limited sliding movements in its connections with each of said bars.

6. A stanchion having relatively fixed and inclinable stanchion bars, and a slide connecting their upper ends, and capable of limited sliding movements in its connections with each of said bars, said slide being slotted near one end and having a pin extending through said slot to connect it with the inclinable bar, and the other bar having a hollow end portion adapted to receive said slide.

7. A stanchion having relatively fixed and inclinable stanchion bars, and a slide connecting their upper ends, and capable of limited sliding movements in its connections with each of said bars, said slide being slotted near one end and having a pin extending through said slot to connect it with the inclinable bar, and the other bar having a hollow end portion adapted to receive said slide, together with latch mechanism adapted to lock said bars together and adapted to prevent movement of either relatively to the slide.

8. The combination with a stanchion supporting frame, a stanchion supported thereby and provided with an inclinable member, latch mechanism adapted to lock the inclinable member in animal retaining position, and a corner brace for said frame, with which the latch mechanism may engage when said inclinable member is in open position, said corner brace being jointed at a plurality of points and adjustably secured to upright and horizontal members of said frame, whereby it may be extended either vertically or laterally.

9. In a device of the described class, the combination of a stanchion supporting frame, a pair of stanchion bars including a stationary and an inclinable bar, a stanchion holding member, and means for adjustably connecting said holding member to said stanchion supporting frame, said holding member being adapted to engage and hold said inclinable bar at any desirable angle to its companion bar.

10. The combination of a stationary and inclinable stanchion bar, a stanchion supporting frame comprising horizontal and vertical members, a stanchion holding member adjustably connected at one end to one of said horizontal members and at its opposite end to said vertical member, and means connected with said inclinable stanchion bar adapted to engage said holding member.

11. The combination of a pair of stanchion bars, a stanchion supporting frame, a holding device adapted to engage and hold the inclinable member of such pair of stanchions, said holding device comprising a vertical member adjustably secured at its upper end to the horizontal member of said frame and at its lower end to the vertical member of said frame.

In testimony whereof we affix our signatures in the presence of two witnesses.

JOHN G. SHODRON.
JOHN B. OLSON.

Witnesses:
E. F. FEUGNER,
ROBT. F. PARKS.